(12) United States Patent
Ota

(10) Patent No.: US 11,774,809 B2
(45) Date of Patent: Oct. 3, 2023

(54) LIQUID CRYSTAL DISPLAY PANEL

(71) Applicant: Japan Display Inc., Tokyo (JP)

(72) Inventor: Akio Ota, Tottori (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/323,237

(22) Filed: May 18, 2021

(65) Prior Publication Data

US 2021/0271139 A1    Sep. 2, 2021

Related U.S. Application Data

(63) Continuation of application No. 16/226,136, filed on Dec. 19, 2018, now Pat. No. 11,036,096, which is a
(Continued)

(51) Int. Cl.
  *G02F 1/1335* (2006.01)
  *G02F 1/1343* (2006.01)
  (Continued)

(52) U.S. Cl.
  CPC .. *G02F 1/134363* (2013.01); *G02F 1/133345* (2013.01); *G02F 1/133512* (2013.01);
  (Continued)

(58) Field of Classification Search
  CPC ............. G02F 1/1343; G02F 1/134309; G02F 1/134318; G02F 1/134345; G02F 1/134363; G02F 1/13439; G02F 1/134336; G02F 1/134372; G02F 1/1333; G02F 1/133345; G02F 1/133388; G02F 1/133391; G02F 1/133512; G02F 1/1362; G02F 1/136209;
  (Continued)

(56) References Cited

U.S. PATENT DOCUMENTS

| 5,617,230 A | 4/1997 | Ohgawara |
| 5,936,694 A | 8/1999 | Suzuki |

(Continued)

FOREIGN PATENT DOCUMENTS

| JP | 2001-033799 | 2/2001 |
| JP | 3194127 | 7/2001 |

(Continued)

OTHER PUBLICATIONS

Japanese Office Action dated Nov. 26, 2013 in corresponding Japanese Patent Application No. 2009-138908.

*Primary Examiner* — Thoi V Duong
(74) *Attorney, Agent, or Firm* — K&L Gates LLP

(57) ABSTRACT

A transverse electric field type liquid crystal display panel includes a pair of substrates opposed with a liquid crystal layer interposed therebetween. A plurality of sub-pixels having at least one curved portion in a display area are provided in a matrix on one side of the pair of substrates, and a pair of electrodes having at least one curved portion are formed in the plurality of sub-pixels. A light shield layer shielding a non-display area positioned on an outer peripheral side of the display area and between the plurality of sub-pixels is formed on the other side of the pair of substrates. The light shield layer of the non-display area is formed in a shape in which the outermost peripheral side of the display area is rectangular.

7 Claims, 8 Drawing Sheets

Related U.S. Application Data continuation of application No. 15/341,758, filed on Nov. 2, 2016, now Pat. No. 10,180,604, which is a continuation of application No. 14/689,379, filed on Apr. 17, 2015, now Pat. No. 9,507,223, which is a continuation of application No. 14/048,113, filed on Oct. 8, 2013, now Pat. No. 9,041,884, which is a continuation of application No. 13/330,150, filed on Dec. 19, 2011, now Pat. No. 8,582,060.

(51) Int. Cl.
*G02F 1/1362* (2006.01)
*G02F 1/1333* (2006.01)
*G02F 1/1337* (2006.01)

(52) U.S. Cl.
CPC .. *G02F 1/133707* (2013.01); *G02F 1/134336* (2013.01); *G02F 1/133388* (2021.01); *G02F 1/134345* (2021.01); *G02F 1/134372* (2021.01); *G02F 1/136286* (2013.01)

(58) Field of Classification Search
CPC ......... G02F 1/136227; G02F 1/136286; G02F 1/1368; G02F 1/133707
See application file for complete search history.

(56) References Cited

U.S. PATENT DOCUMENTS

| | | |
|---|---|---|
| 6,744,048 B2 | 6/2004 | Hosokawa et al. |
| 6,801,275 B2 | 10/2004 | Lim |
| 6,897,930 B2 | 5/2005 | Nakayoshi et al. |
| 6,914,657 B2 | 7/2005 | Kim et al. |
| 7,253,856 B2 | 8/2007 | Kim et al. |
| 7,466,371 B2 | 12/2008 | Matsuda |
| 9,041,884 B2 | 5/2015 | Ota |
| 2002/0054253 A1 | 5/2002 | Cho |
| 2004/0119927 A1 | 6/2004 | Kang et al. |
| 2009/0109358 A1 | 4/2009 | Tanaka et al. |
| 2009/0195481 A1 | 8/2009 | Taguchi |
| 2009/0225267 A1 | 9/2009 | Atarashiya |
| 2010/0214195 A1 | 8/2010 | Ogasawara |
| 2010/0289994 A1 | 11/2010 | Nonaka |
| 2011/0058128 A1* | 3/2011 | Adachi ............. G02F 1/133528 349/96 |

FOREIGN PATENT DOCUMENTS

| | | |
|---|---|---|
| JP | 2002-014374 | 1/2002 |
| JP | 2005-062760 | 3/2005 |
| JP | 2008-020660 | 1/2008 |
| JP | 2008083386 | 4/2008 |
| JP | 2009-109820 | 5/2009 |

* cited by examiner

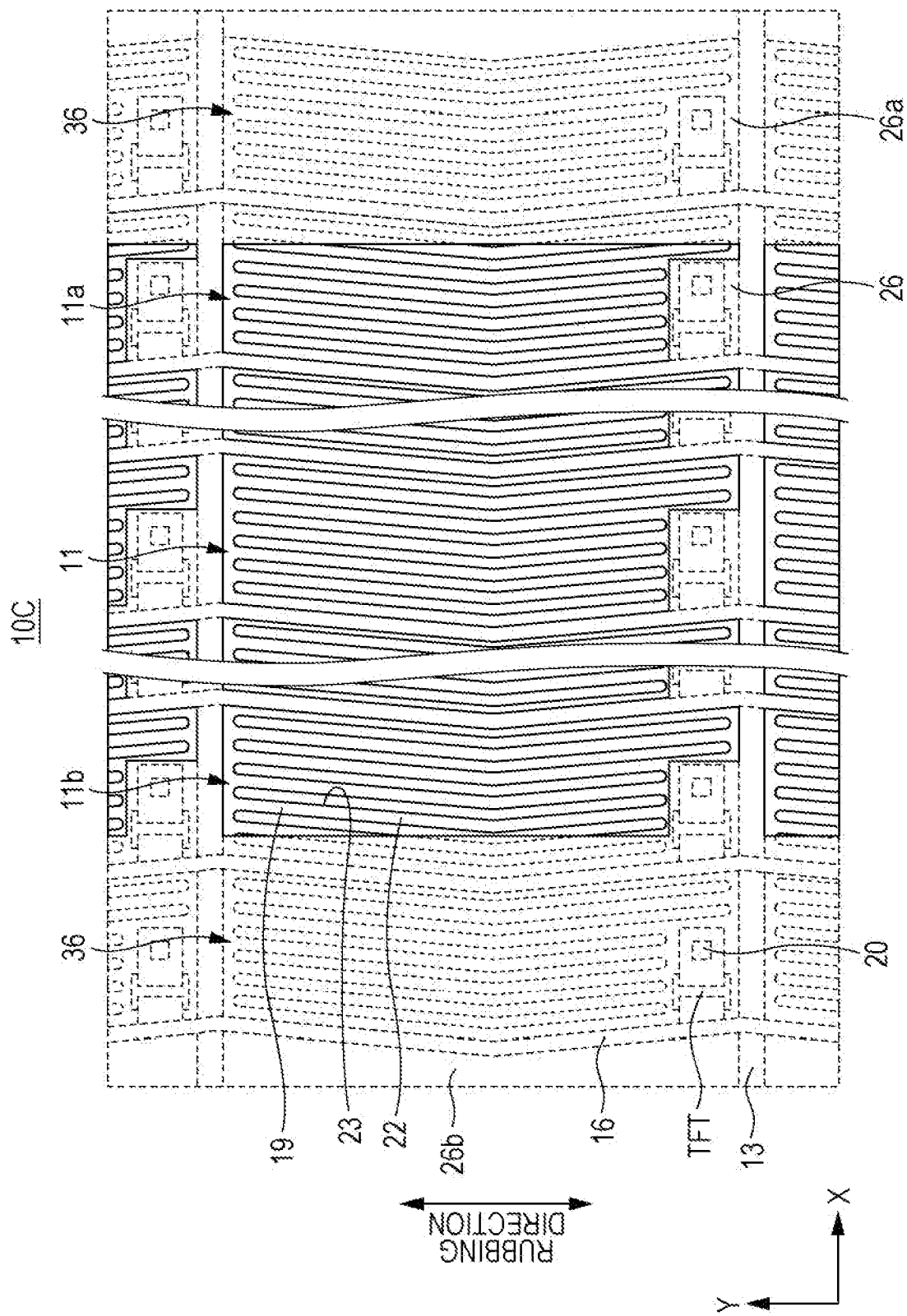

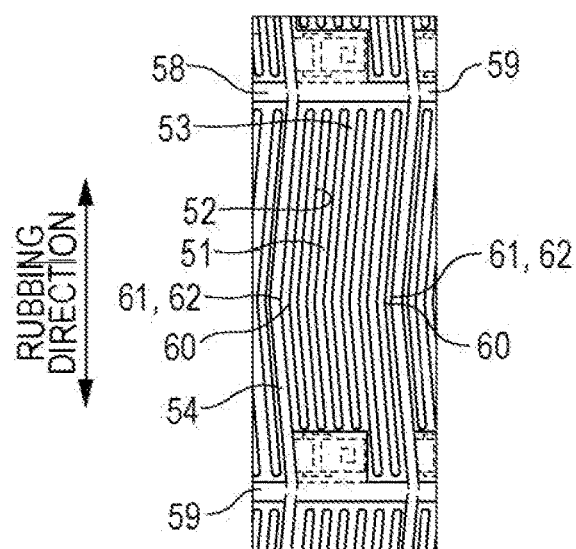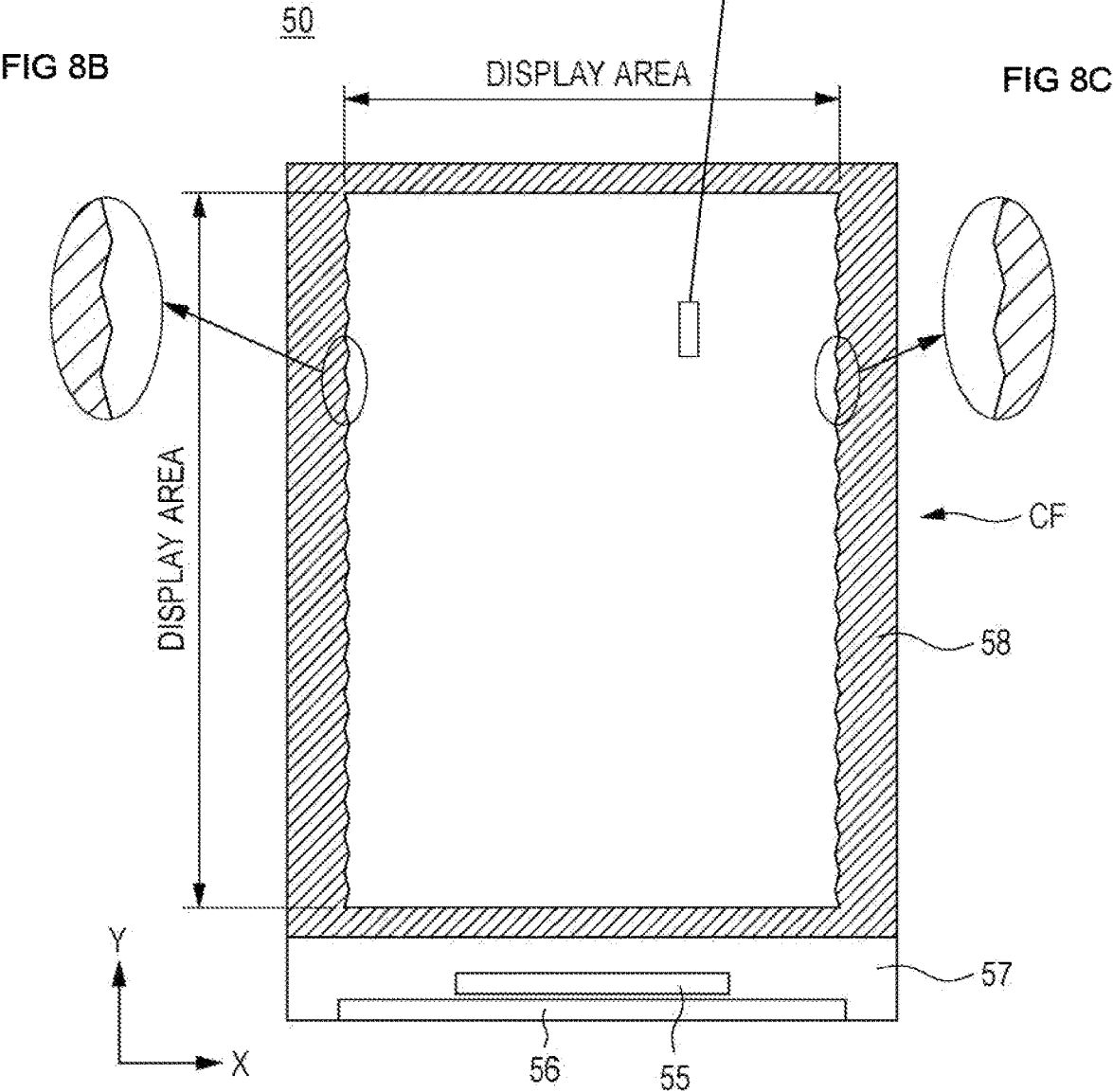

LIQUID CRYSTAL DISPLAY PANEL

CROSS REFERENCES TO RELATED APPLICATIONS

The present application is a continuation of U.S. patent application Ser. No. 16/226,136, filed on Dec. 19, 2018, which is a continuation of U.S. patent application Ser. No. 15/341,758, filed on Nov. 2, 2016, issued as U.S. Pat. No. 10,180,604 on Jan. 15, 2019, which is a continuation of U.S. patent application Ser. No. 14/689,379, filed on Apr. 17, 2015, issued as U.S. Pat. No. 9,507,223 on Nov. 29, 2016 which application is a continuation of U.S. patent application Ser. No. 14/048,113, filed Oct. 8, 2013, issued as U.S. Pat. No. 9,041,884 on May 26, 2015, which application is a continuation of U.S. patent application Ser. No. 13/330,150, filed on Dec. 19, 2011, issued as U.S. Pat. No. 8,582,060 on Nov. 12, 2013, which contains subject matter related to Japanese Patent Application JP 2009-138908 filed in the Japan Patent Office on Jun. 10, 2009, the entire content of each of which is hereby incorporated by reference.

BACKGROUND

The present disclosure relates to a transverse electric field type liquid crystal display panel, and more particularly, to a transverse electric field type liquid crystal display panel with a high aperture ratio, in which a shape of a sub-pixel has a curved portion and an end portion of a display area is rectangular.

Liquid crystal display panels have the characteristics of being light weight, thin, and having low power consumption as compared with CRTs (cathode ray tubes), and thus are used in various electronic apparatuses as displays. Through the use of a rubbing-processed alignment film, a liquid crystal display panel changes the direction of liquid crystal molecules arranged in a predetermined direction by an electric field, thereby changing a transmittance ratio or a reflectance ratio of light to display an image.

As a method of applying an electric field to a liquid crystal layer of the liquid crystal display panel, there are a longitudinal electric field manner and a transverse electric field manner. In the longitudinal electric field type liquid crystal display panel, a substantially longitudinal electric field is applied to liquid crystal molecules by a pair of electrodes disposed with a liquid crystal layer interposed therebetween. As the longitudinal electric field type liquid crystal display panel, a TN (Twisted Nematic) mode, a VA (Vertical Alignment) mode, an MVA (Multi-domain Vertical Alignment) mode and the like are known. In the transverse electrical field type liquid crystal display panel, a pair of electrodes insulated from each other are provided on the inside of one of a pair of substrates disposed with a liquid crystal layer interposed therebetween, and a substantially transverse electric field is applied to the liquid crystal molecules. As the transverse electric field type liquid crystal display panel, one of an IPS (In-Plane Switching) mode in which a pair of electrodes are not overlapped in the plan view, and one of an FFS (Fringe Field Switching) mode in which a pair of electrodes are overlapped are known.

In the IPS mode liquid crystal display panel, a pair of electrodes, such as a pixel electrode and a common electrode, is formed in a tooth shape to engage with each other in a state of electrical insulation, and a transverse electric field is applied to the liquid crystal between the pixel electrode and the common electrode. The IPS mode liquid crystal display device has an advantage of a wide view angle wider than that of the longitudinal electric field type liquid crystal display device.

In the FFS mode liquid crystal display panel, a pair of electrodes such as an upper electrode and a lower electrode are provided on layers different from each other with an insulating film interposed therebetween, a slit-shaped aperture is provided in the upper electrode, and a substantially transverse electric field passing through the slit-shaped aperture is applied to a liquid crystal layer. Since the FFS mode liquid crystal display panel is capable of obtaining a wide view angle and has an effect whereby image contrast is capable of being improved, recently, it has come into widespread use.

In the transverse electric field type liquid crystal display panel, the slit-shaped aperture (case of FFS mode) formed in the upper electrode or an aperture (case of IPS mode, hereinafter, also referred to as "slit-shaped aperture") formed between both electrodes in the plan view extends to be slightly inclined with respect to a rubbing direction, to enable rotation of the liquid crystal molecules in the same direction. In a color display liquid crystal display panel, it is possible to reduce the change of color caused by the view angle, by a multi-domain process of dividing the inclination angle with respect to the rubbing direction of the slit-shaped aperture into two positive and negative areas. However, since it is difficult to form an electric field in a desired direction at an end portion of the slit-shaped aperture, when the slit-shaped apertures in the extending directions different from each other are separated, the number of end portions of the slit-shaped apertures increases and as a result the aperture ratio is lowered.

In a liquid crystal display panel disclosed in Japanese Unexamined Patent Application Publication No. 2002-014374 or Japanese Unexamined Patent Application Publication No. 2008-083386, a slit-shaped aperture is provided with a curved portion, the multi-domain process is achieved and the aperture ratio is increased by connecting slit-shaped apertures extending in different directions.

SUMMARY

When the slit-shaped aperture provided with the curved portion is formed in the sub-pixel demarcated by a signal line and a scanning line longitudinally and transversely extending in a linear shape like the transverse electric field type liquid crystal display panel disclosed Japanese Unexamined Patent Application Publication No. 2002-014374 or Japanese Unexamined Patent Application Publication No. 2008-083386, the width of a part of the electrodes becomes large. Accordingly, an electrode area, which is away from the slit-shaped aperture and does not particularly contribute to the generation of an electric field for driving the liquid crystal, is created, and thus the aperture ratio decreases.

For this reason, as disclosed in Japanese Patent No. 3194127, the signal lines and the scanning lines are curved to be parallel to the slit-shaped aperture provided with the curved portion such that the shape of the electrode is the same shape as that of the slit-shaped aperture provided with the curved portion, and thus the sub-pixel has the same curved shape as that of the slit-shaped aperture. A liquid crystal display panel 50 disclosed in Japanese Patent No. 3194127 will be described with reference to FIG. 8A, FIG. 8B, and FIG. 8C. FIG. 8A, FIG. 8B, and FIG. 8C are a plan view and partially enlarged views of the liquid crystal display panel disclosed in Japanese Patent No. 3194127.

As shown in the partially enlarged view of FIG. 8A of one sub-pixel, the liquid crystal display panel 50 is the FFS mode liquid crystal display panel, the upper electrode 51 is provided with a slit-shaped aperture 52, and the upper electrode 51 and the lower electrode 53 have curved shapes similarly to the slit-shaped aperture 52. An array substrate AR has an extending portion 57 provided with a driver terminal 55 and a flexible printed board terminal 56. A color filter substrate CF can be bonded to a part other than the extending portion 57 of the array substrate AR. The color filter substrate CF is provided with a light shield layer 58 forming an aperture of the display area by shielding a non-display area.

The upper electrode 51 of the sub-pixel of the display area has a slit-shaped aperture 52 extending in a direction (Y-axis direction in FIG. 8A) of the signal line 54. The scanning line 59 linearly extends in a direction (X-axis direction in FIG. 8A) intersecting with the signal line 54, and the areas surrounded with the signal lines 54 and the scanning lines 59 in the plan view constitute the sub-pixels. The slit-shaped aperture 52 is provided with a "<"-shaped curved portion 60. The slit-shaped aperture 52 extends in the positive and negative reverse direction with respect to the rubbing process performed in the Y-axis direction in FIG. 8A. Accordingly, in the liquid crystal display panel 50, it is possible to reduce the change of color caused by the view angle.

The upper electrode 51 and the lower electrode 53, and the signal line 54 are also provided with the curved portion 61 and the curved portion 62 taken along the curved portion 60 of the slit-shaped aperture 52, respectively. Accordingly, the slit-shaped aperture 52, and the upper electrode 51 and the signal line 54 are parallel to each other, and thus the area where the electric field becomes weak is not formed in the upper electrode 51. Therefore, the aperture ratio becomes high as compared with the liquid crystal display panel disclosed in Japanese Unexamined Patent Application Publication No. 2002-014374 or Japanese Unexamined Patent Application Publication No. 2008-083386.

As described above, when the signal line 54 is provided with the curved portion and each sub-pixel has the curved portion, the light shield layer 58 of the color filter substrate for preventing light leakage between the sub-pixels is also provided with the curved portion taken along the signal line 54, as described in Japanese Patent No. 3194127. However, as shown in the partially enlarged views of FIG. 8B and FIG. 8C, the innermost peripheral side of the light shield layer 58 of the non-display area forming the aperture end portion of the display area is also provided with the curved portion, and thus there is a problem that the periphery of the display area is jagged. The problem occurs also in the case of the IPS mode liquid crystal display panel.

It is desirable to provide a transverse electric field type liquid crystal display panel with a high aperture ratio in which an aperture end of a display area is rectangular in a transverse electric field type liquid crystal display panel in which a shape of each-sub-pixel has a curved portion.

According to an embodiment of the present disclosure, there is provided a transverse electric field type liquid crystal display panel including a pair of substrates opposed with a liquid crystal layer interposed therebetween, wherein a plurality of sub-pixels having at least one curved portion in a display area are provided in a matrix on one side of the pair of substrates, and a pair of electrodes having at least one curved portion are formed in the plurality of sub-pixels, wherein a light shield layer shielding a non-display area positioned on an outer peripheral side of the display area and between the plurality of sub-pixels is formed on the other side of the pair of substrates, and wherein the light shield layer of the non-display area is formed in a shape in which the outermost peripheral side of the display area is rectangular.

In the transverse electric field type liquid crystal display panel of the present disclosure, the plurality of sub-pixels having at least one curved portion are provided in a matrix in the display area on one side of the pair of substrates, that is, an array substrate side, and the plurality of sub-pixels are provided with a pair of electrodes having at least one curved portion. With such a configuration, the area which is not used for display becomes narrow, and thus it is possible to obtain the transverse electric field type liquid crystal display panel with a high aperture ratio and high brightness. However, the light shield layer shielding the non-display area positioned on the outer peripheral side of the display area and between the plurality of sub-pixels is formed on the other side of the pair of substrates, that is, a color filter substrate. However, the innermost peripheral side of the light shield layer of the non-display area forming the aperture end portion of the display area is also provided with the curved portion, and thus the periphery of the display area becomes jagged.

According to the liquid crystal display panel of the embodiment of the present disclosure, the light shield layer of the non-display area is formed in the shape in which the outermost peripheral side of the display area is rectangular. Accordingly, the aperture end portion of the display area can be made rectangular, and thus the periphery of the display area becomes smooth, which is visually satisfactory.

In the liquid crystal display panel according to an embodiment of the present disclosure, signal lines and scanning lines may be formed on one side of the pair of substrates, and the signal lines and the scanning lines may be curved along the shape of the sub-pixels.

When the sub-pixel is provided with the curved portion, one side of the signal line and the scanning line is curved according to the shape of the curved sub-pixel, and the other side of the signal line and the scanning line linearly extends. For this reason, according to the liquid crystal display panel according to the embodiment of the present disclosure, the pair of electrodes can be disposed throughout the area between the signal lines and between the scanning lines, and thus it is possible to improve the aperture ratio. According to the embodiment of the present disclosure, it is possible to obtain the effect of the present disclosure even in any of a case where the sub-pixels are curved in a column direction along the signal lines and a case where the sub-pixels are curved in a line direction along the scanning lines.

In the liquid crystal display according to the embodiment of the present disclosure, it is preferable that when the outermost side of the sub-pixel positioned on the outermost peripheral side of the display area is an inner angle side, the light shield layer of the non-display area is formed to pass through a curved point of the inner angle side of the sub-pixel.

According to the embodiment of the present disclosure, it is possible to make the periphery of the display area smooth while preventing the aperture ratio from decreasing. When the outermost side of the sub-pixel positioned on the outermost peripheral side of the display area is the inner angle side, and when the shielding is performed to the side closer to the display area than the curved point of the inner angle side positioned on the outermost side of the display area by the light shield layer of the non-display area, the jaggedness does not occur in the periphery of the display area, but the bright area of the sub-pixels is widely shielded, which is not preferable. Similarly, when the side closer to the non-display area side than the curved point of the inner angle side positioned on the outermost side of the display area is covered by the light shield layer of the non-display area, the outer angle side of the signal lines and the scanning lines is exposed to the display area side, and the jaggedness occurs in the periphery of the display area, which is not preferable.

In the liquid crystal display panel according to the embodiment of the present disclosure, it is preferable that when the outermost side of the sub-pixel positioned on the outermost peripheral side of the display area is an outer angle side, the light shield layer of the non-display area is formed to pass through an end point of the outer angle side of the sub-pixel.

In the present disclosure, "the end point of the outer angle side" means an angled portion of the outer angle side of angled portions of four corners of each sub-pixel. In the liquid crystal display device according to the embodiment of the present disclosure, it is possible to make the periphery of the display area smooth while preventing the aperture ratio from decreasing. When the outermost side of the sub-pixel positioned on the outermost peripheral side of the display area is the outer angle side, and when the shielding is performed to the display area over the end point of the outer angle side positioned on the outermost side of the display area by the light shield layer of the non-display area, the jaggedness does not occur in the periphery of the display area, but the bright area of the sub-pixels is widely shielded, which is not preferable. Similarly, when the side closer to the non-display area side than the end point of the outer angle side positioned on the outermost side of the display area is shielded by the light shield layer of the non-display area, the inner angle side of the signal lines and the scanning lines is exposed to the display area side, and the jaggedness occurs in the periphery of the display area, which is not preferable.

In the liquid crystal display panel according to the embodiment of the present disclosure, it is preferable that the sub-pixels of the outermost peripheral side of the display area have an area wider than that of the other sub-pixels.

When the sub-pixels of the outermost peripheral side of the display area are covered by the light shield layer of the non-display area, the area of the aperture portion of the sub-pixels of the outermost peripheral side of the display area becomes small. According to the liquid crystal display device of the embodiment of the present disclosure, the sub-pixels of the outermost peripheral side of the display area have the area wider than that of the other sub-pixels. Accordingly, even when the sub-pixels of the outermost peripheral side of the display area are covered by the light shield layer of the non-display area, the area of the aperture portion can be the same as that of the other sub-pixels, and thus the sub-pixels of the outermost peripheral side of the display area are prevented from being dark.

In the liquid crystal display panel of the embodiment of the present disclosure, it is preferable that a dummy pixel is formed on the outside of the display area, and the dummy pixel is in an inactive state.

The dummy pixel simulates the same configuration as that of the sub-pixel. For example, the dummy pixel may serve as an electrostatic protective circuit. In the transverse electric field type liquid crystal display panel, on the further outer peripheral side of the sub-pixels of the outermost peripheral side of the display area, liquid crystal of the outside thereof is not driven, and thus a domain (alignment defect) occurs. According to the embodiment of the present disclosure, the domain occurring on the further outer peripheral side of the sub-pixels of the outermost peripheral side of the display area can be made into an unrecognizable state by the light shield layer of the non-display area. For this reason, according to the liquid crystal display panel of the embodiment of the present disclosure, even when the dummy pixel is provided, the deterioration of the display image quality of the sub-pixels of the outermost peripheral side of the display area is reduced.

In the liquid crystal display panel of the embodiment of the present disclosure, it is preferable that the pair of electrodes are formed of a lower electrode, an insulating film formed on the lower electrode, and an upper electrode formed on the insulating film and provided with a slit-shaped aperture curved along the shape of the sub-pixel.

According to the liquid crystal display panel of the embodiment of the present disclosure, it is possible to obtain the FFS mode liquid crystal display panel having the effect of the present disclosure.

In the liquid crystal display panel of the embodiment of the present disclosure, it is preferable that the pair of electrodes are opposed to each other in a pectinated shape, and are curved along the shape of the sub-pixel.

According to the liquid crystal display panel of the embodiment of the present disclosure, it is possible to obtain the IPS mode liquid crystal display panel having the effect of the present disclosure.

Additional features and advantages are described herein, and will be apparent from the following Detailed Description and the figures.

BRIEF DESCRIPTION OF THE FIGURES

FIG. 7 is a plan view illustrating a liquid crystal display panel of a fourth embodiment.

FIG. 8A to FIG. 8C are plan views illustrating a display area of a liquid crystal display panel of the related art.

DETAILED DESCRIPTION

Figure 1:
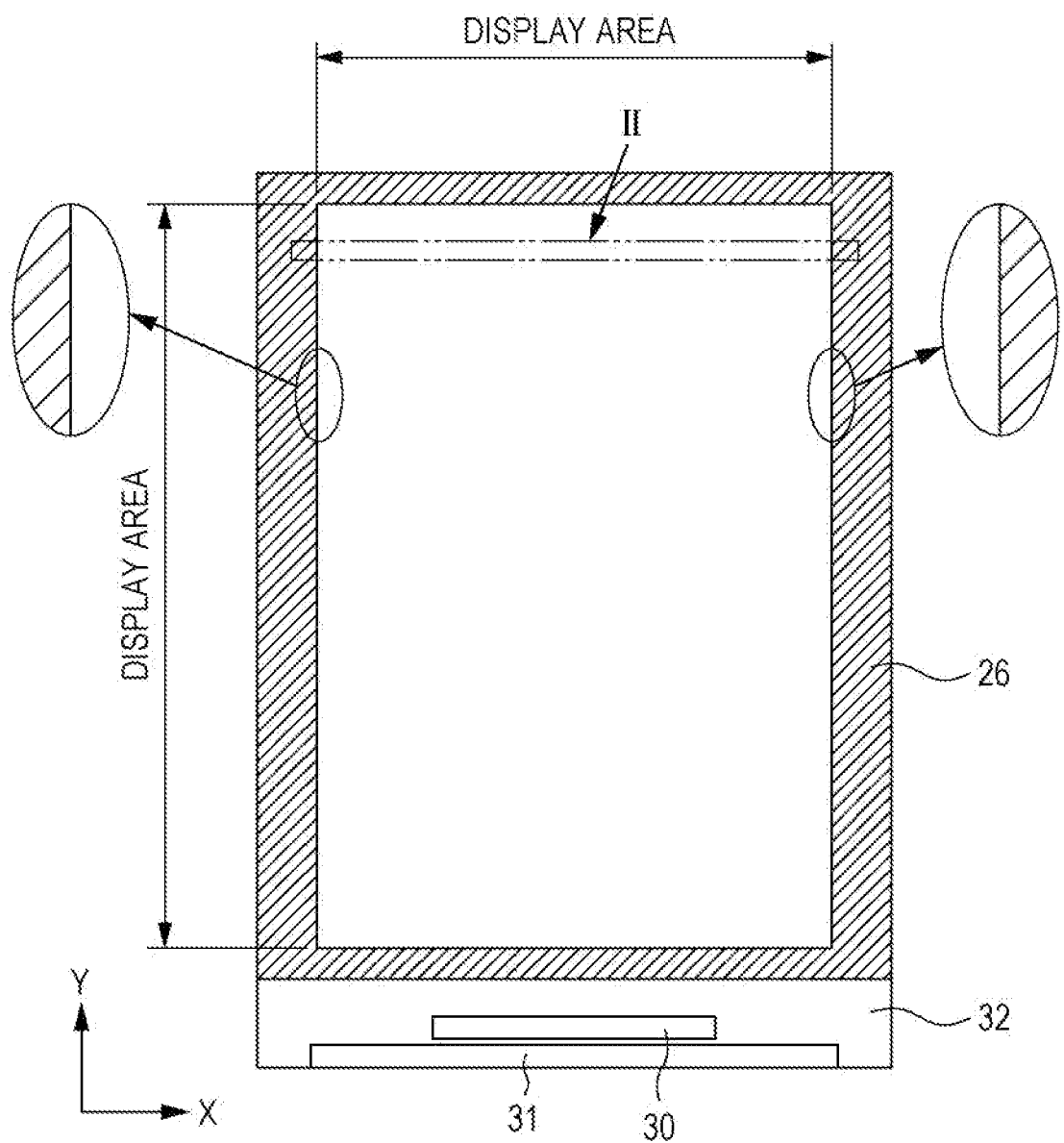
FIG. 1 is a plan view illustrating a display area of a liquid crystal display panel of a first embodiment.

Hereinafter, embodiments of the present disclosure will be described with reference to the drawings, exemplifying a case of an FFS mode transverse electric field type liquid crystal display panel. However, the following embodiments do not intend that the present disclosure is limited to the description, and the present disclosure may be applied to various modifications in the same manner without deviating from the technical concept described in the Claims. In the drawings for description in the specification, the scales are different according to layers and members in order that the layers and members are recognizable on the drawings, and they are not necessarily proportional to the actual size.

First Embodiment

Figure 3:
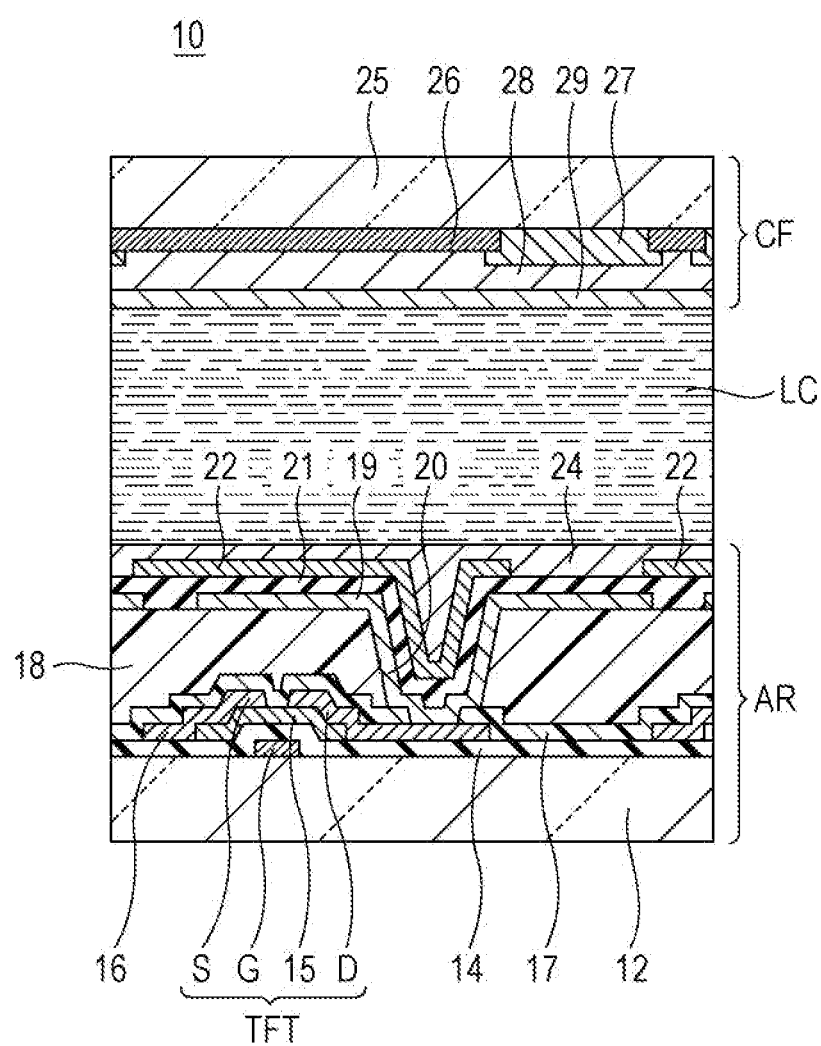
FIG. 3 is a cross-sectional view taken along the line shown in FIG. 2.
Figure 4:
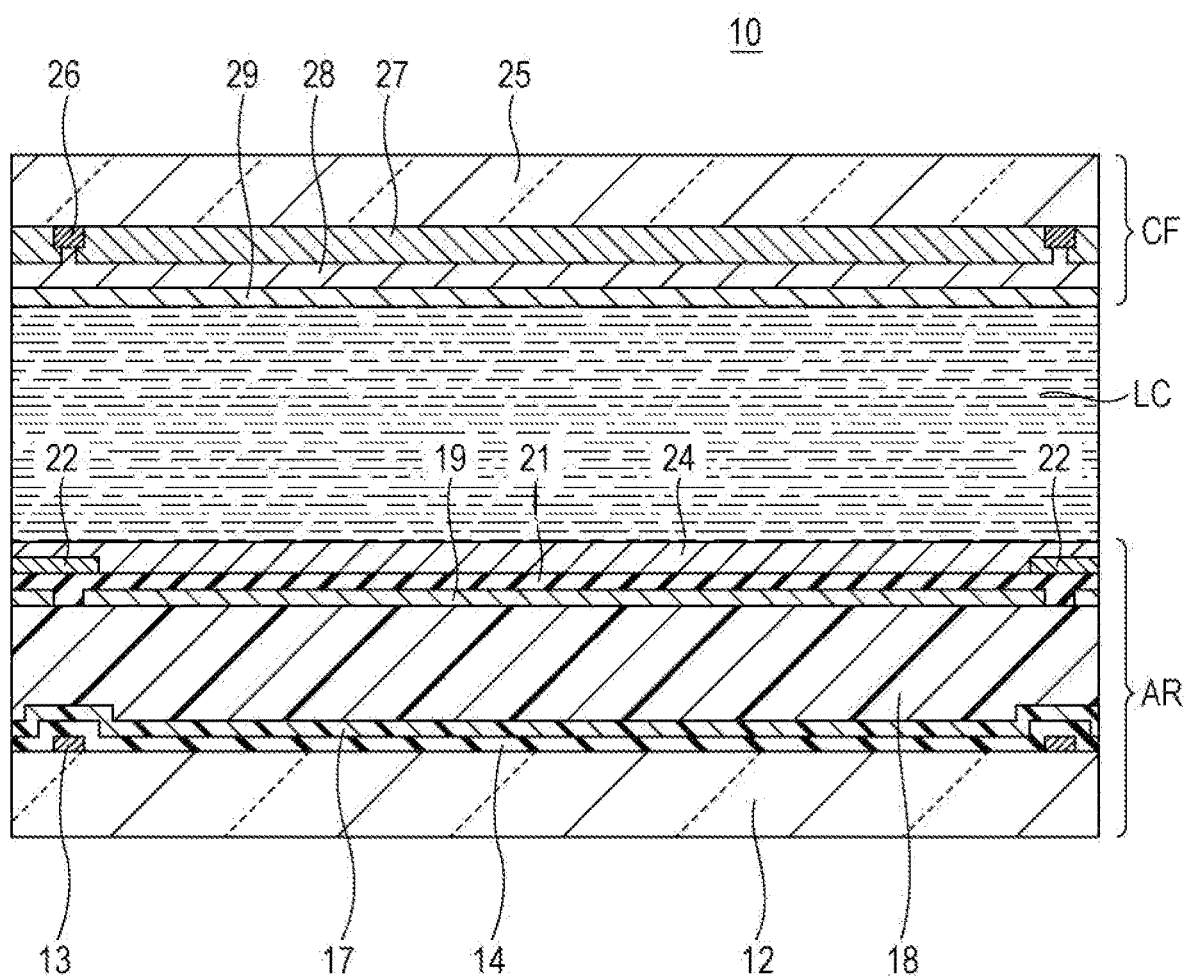
FIG. 4 is a cross-sectional view taken along the line IV-IV shown in FIG. 2.

A configuration of main parts of a liquid crystal display panel 10 of a first embodiment will be described with reference to FIG. 1 to FIG. 4. The liquid crystal display panel 10 operates in the FFS mode, and has a plurality of sub-pixels 11 arranged in a matrix. In the liquid crystal display panel 10, a liquid crystal layer LC is interposed between an array substrate AR and a color filter substrate CF as shown in FIG. 3 and FIG. 4. A base substrate of the array substrate AR is a first transparent substrate 12 formed of transparent insulating glass, quartz, plastic, or the like. On the first transparent substrate 12, scanning lines 13 formed of metal such as opaque aluminum and molybdenum are formed in the X-axis direction (line direction) shown in FIG. 2 on the side coming in contact with the liquid crystal layer LC. A gate electrode G is provided to extend from the scanning line 13, for example, on the left downside of each sub-pixel 11.

A transparent gate insulating film 14 formed of silicon nitride or silicon oxide is laminated to cover the scanning line 13 and the gate electrode G. A semiconductor layer 15 formed of amorphous silicon or polycrystalline silicon is formed on the gate insulating film 14 overlapping with the gate electrode G in the plan view. A plurality of signal lines 16 formed of metal such as aluminum and molybdenum is formed on the gate insulating film 14 in the Y-axis direction (column direction) shown in FIG. 1. Each of areas partitioned by the scanning lines 13 and the signal lines 16 is a sub-pixel area. A source electrode S is provided to extend from the signal line 16, and the source electrode S comes in partial contact with the surface of the semiconductor layer 15.

A drain electrode D simultaneously formed of the same material as that of the signal line 16 and the source electrode S is provided on the gate insulating film 14, and the drain electrode D is provided close to the source electrode S to come in partial contact with the surface of the semiconductor layer 15. Since one substantially square pixel (not shown) is configured by three sub-pixels of R (red), G (green), and B (blue), the sub-pixels 11 trisecting the pixel are rectangular in which the side of the scanning line 13 is a short side and the side of the signal line 16 is a long side. A thin film transistor TFT that is a switching element is configured by the gate electrode G, the gate insulating film 14, the semiconductor layer 15, the source electrode S, and the drain electrode D, and each sub-pixel 11 is provided with the TFT.

A transparent passivation film 17 formed of, for example, silicon nitride or silicon oxide is laminated to cover an exposed part of the signal line 16, the thin film transistor TFT, and the gate insulating film 14. An interlayer resin film 18 formed of a transparent resin material such as photoresist is laminated to cover the passivation film 17. A lower electrode 19 formed of a transparent conductive material such as ITO (Indium Thin Oxide) and IZO (Indium Zinc Oxide) is formed to cover the interlayer resin film 18. A contact hole 20 passing through the first interlayer resin film 18 and the passivation film 17 and reaching the drain electrode D is formed, and the lower electrode 19 and the drain electrode D are electrically connected to each other through the contact hole 20. For this reason, the lower electrode 19 operates as a pixel electrode.

A transparent interlayer insulating film 21 formed of, for example, silicon nitride or silicon oxide is laminated to cover the lower electrode 19. An upper electrode 22 formed of a transparent conductive material such as ITO or IZO is formed to cover the interlayer insulating film 21. In the liquid crystal display device 10 of the first embodiment, the upper electrode 22 is connected (not shown) to a common line at a peripheral portion of the display area, and operates as a common electrode. In the liquid crystal display device 10, the upper electrode may operate as a pixel electrode, and the lower electrode may operate as a common electrode.

Figure 2:
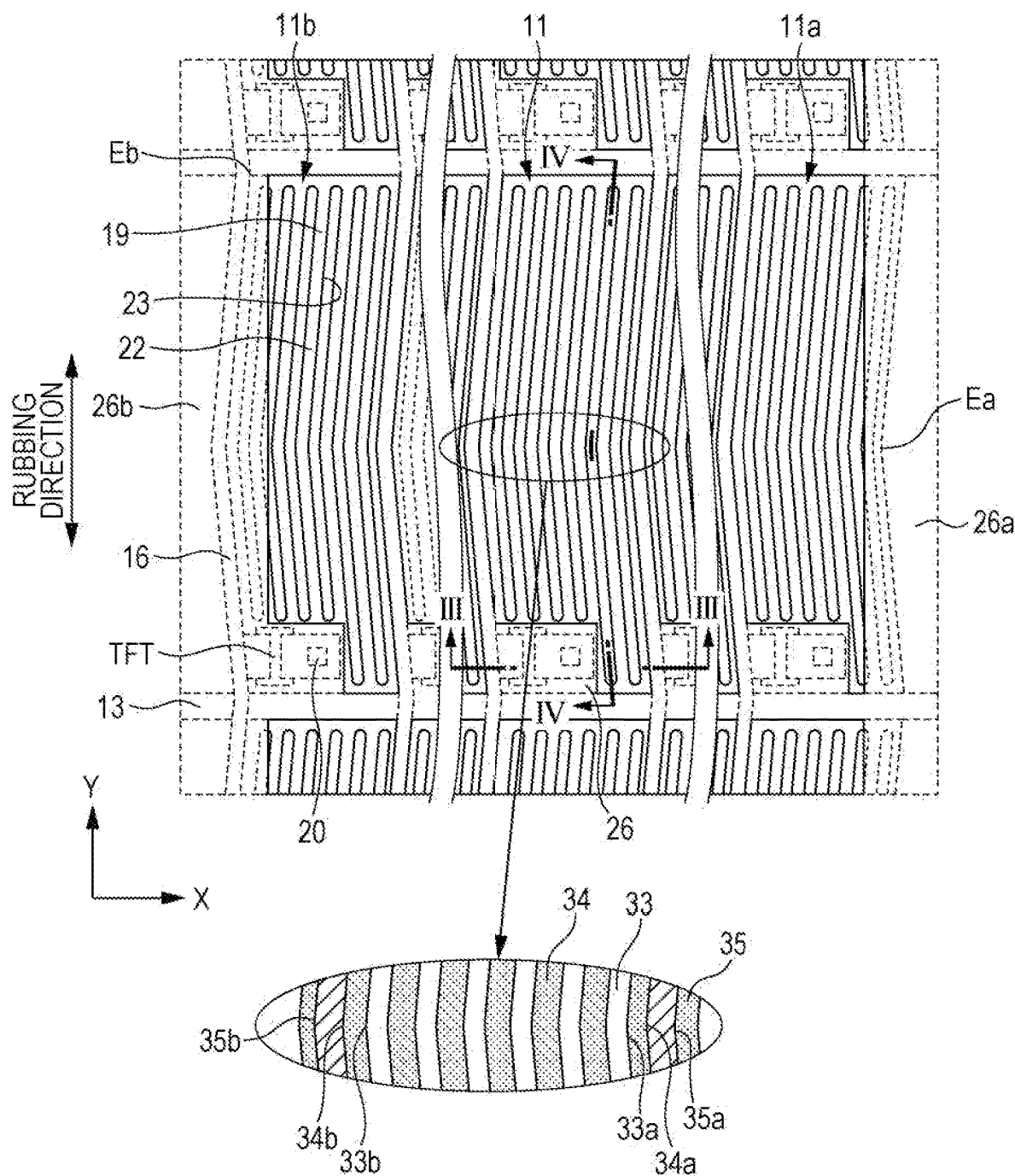
FIG. 2 is an enlarged view of a part II shown in FIG. 1.

As shown in FIG. 2, the upper electrode 22 is provided with a plurality of slit-shaped apertures 23. The slit-shaped apertures 23 are formed by exposing, developing, and then etching a photoresist material applied onto the surface of the upper electrode 22 according to photolithography. A specific shape and the like of the slit-shaped apertures 23 will be described later. A first alignment film 24 formed of polyimide is laminated to cover the upper electrode 22. A liquid crystal direction alignment process, that is, a rubbing process is performed on the first alignment film 24 in the Y-axis direction (a direction substantially parallel to the extending direction of the signal line 16) shown in FIG. 2.

A base substrate of the color filter substrate CF is a second transparent substrate 25 formed of transparent insulating glass, quartz, plastic, or the like. The second transparent substrate 25 is provided with a light shield layer 26 and a color filter layer 27 passing different colors of light (e.g., R (red), G (green), and B (blue)) for each sub-pixel. The light shield layer 26 is formed of a part formed to overlap with the scanning line 13, the signal line 16, the TFT, and the drain electrode D in the plan view, and a part covering a non-display area of the second transparent substrate 25 to form the apertures of the display area. The display area is an area where an image recognizable by a user is substantially displayed.

The color filter layer 27 is formed in the area of the sub-pixel 11 where the light shield layer 26 is not formed. An overcoat layer 28 formed of, for example, a transparent resin material such as photoresist is laminated to cover the light shield layer 26 and the color filter layer 27. The overcoat layer 28 is formed to planarize a level difference caused by the color filter layer 27 for a different color and to prevent impurities flowing out of the light shield layer 26 or the color filter layer 27 from entering the liquid crystal layer LC. A second alignment film 29 formed of polyimide is formed to cover the overcoat layer 28. A rubbing process in the reverse direction to the first alignment film 24 is performed on the second alignment film 29.

The array substrate AR and the color filter substrate CF formed as described above are opposed to each other, a seal member (not shown) is provided in the periphery of both substrates to bond and combine both substrates, thereby obtaining a liquid crystal display panel 10 according to the first embodiment. A spacer (not shown) for keeping the liquid crystal layer LC to be a predetermined thickness is formed on the color filter substrate CF. The array substrate AR has an extending portion 32 in which a driver terminal 30 and a flexible printed board terminal 31 are provided. A part other than the extending portion 32 of the array substrate AR is adhered to the color filter substrate CF.

In the configuration described above, when the TFT is turned on and voltage is applied between the lower electrode 19 and the upper electrode 22, an electric field occurs between both electrodes 19 and 22 to change an alignment direction of liquid crystal molecules of the liquid crystal layer LC. Accordingly, optical transmissivity of the liquid crystal layer LC is changed to display an image. Assistant capacitance is incidentally formed by the lower electrode 19, the upper electrode 22, and the interlayer insulating film 21. When the TFT is turned off, the electric field between both electrodes 19 and 22 is kept for a predetermined time.

The slit-shaped apertures 23 formed in the upper electrode 22 will be described with reference to FIG. 2. In the FFS mode liquid crystal display panel 10, the electric field occurs due to a potential difference between the upper electrode 22 and the lower electrode 19 positioned under the slit-shaped apertures 23. The electric field occurs substantially in parallel to the face of the array substrate AR, and the direction of the electric field in the plan view is a perpendicular line direction of an edge of the slit-shaped aperture 23. Since the electric field direction is different from the electric field direction of the long side part of the slit-shaped aperture 23 at both ends of the slit-shaped aperture 23, a reverse twist domain occurs. In the reverse twist domain, since normal displaying is not performed, a decrease of an aperture ratio is caused.

Around both ends of the slit-shaped apertures 23, there are areas for closing the slit-shaped apertures 23, and thus the aperture ratio further decreases. Since the sub-pixel 11 in the liquid crystal display panel 10 of the embodiment is longitudinal, the number of end portions of the slit-shaped apertures 23 when the slit-shaped apertures 23 extend in the transverse direction is greatly increased. In the liquid crystal display panel 10 of the embodiment, as shown in FIG. 2, the extending direction of the slit-shaped aperture 23 is the extending direction (Y-axis direction shown in FIG. 2) of the signal lines 16, thus the number of end portions of the slit-shaped apertures 23 is reduced, and the aperture ratio is prevented from being lowered.

The extending direction of the slit-shaped apertures 23 is inclined by a predetermined angle (e.g., about 5° to about 15°) with respect to the direction of the rubbing process. Accordingly, the liquid crystal molecules can be rotated in the same direction. When all the slit-shaped apertures 23 are rotated clockwise or anticlockwise, the liquid crystal molecules can be twisted. Accordingly, a phenomenon of changing a color according to a view direction occurs. The reason is because retardation in the external view is changed according to the direction of viewing the liquid crystal molecules. To reduce the phenomenon, the liquid crystal display panel 10 of the embodiment is provided with two domains in which the extending direction of the slit-shaped apertures 23 is inclined in the positive and negative reverse direction with respect to the clockwise direction. That is, it is the multi-domain process.

When the slit-shaped apertures 23 of the domains in different alignment directions are separated, the end portions of the slit-shaped aperture 23 increases. Accordingly, the area where the normal displaying is not performed becomes wide, and thus the aperture ratio decreases. In the liquid crystal display panel 10 of the embodiment, as shown in FIG. 2, the slit-shaped aperture 23 is provided with a curved portion 33 in a "<" shape, and the domains in the different alignment directions are connected. The curved portion 33 of the slit-shaped aperture 23 is formed of an inner angle side curved portion 33a formed at an edge of the inner angle side, and an outer angle side curved portion 33b formed at an edge of the outer angle side. As described above, when the slit-shaped aperture is curved in the "<" shape, the area where the normal displaying is not performed is reduced as compared with the case of separating the slit-shaped apertures 23. Accordingly, it is possible to raise the aperture ratio.

For this reason, in the liquid crystal display panel 10 of the embodiment, the upper electrode 22 also extends in the extending direction (Y-axis direction shown in FIG. 2) of the signal line 16 and is formed in the "<" shape by providing a curved portion 34. The curved portion 34 of the upper electrode 22 is also formed of an inner angle side curved portion 34a formed at an edge of the inner angle side, and an outer angle side curved portion 34b formed at an edge of the outer angle side. The signal line 16 is also provided with a curved portion 35 to be formed in the "<" shape. The curved portion 35 of the signal line 16 is also formed of an inner angle side curved portion 35a formed at an edge of the inner angle side, and an outer angle side curved portion 35b formed at an edge of the outer angle side. Accordingly, since the signal line 16 and the upper electrode 22 are parallel to the slit-shaped aperture 23, the area where the electric field strength becomes weak in the liquid crystal display panel described in Japanese Patent No. 3194127 does not occur. Therefore, it is possible to prevent brightness from decreasing.

In the liquid crystal display panel 10 of the embodiment, each sub-pixel 11 formed of the area surrounded by the signal lines 16 and the scanning lines 13 in the plan view has a shape curved in the "<" shape, by the configuration described above. A curved point of the inner angle side of each sub-pixel 11 is Ea, and an angled portion of the outer angle side among angled portions of four corners of each sub-pixel 11 is an end point Eb.

Since the signal line 16 is provided with the curved portion 35, the light shield layer 26 overlapping with the signal line 16 of the display area is also curved along the curved portion 35 of the signal lien 16. However, as shown in FIG. 1, the light shield layers 26a and 26b of the non-display area forming the aperture of the rectangular display area are not curved, and are linearly formed. That is, in the liquid crystal display panel 10 of the first embodiment, in the sub-pixel 11a (right end in FIG. 2) in which the outermost side of the sub-pixel 11 positioned on the outermost peripheral side of the display area is the inner angle side, the light shielding is performed over the curved point Ea of the inner angle side of the sub-pixel 11a to the display area side by the light shield layer 26a of the non-display area. In the sub-pixel 11b (left end in FIG. 2) in which the outermost side of the sub-pixel 11 positioned on the outermost peripheral side of the display area is the outer angle side, the light shielding is performed over the end point Eb of the outer angle side of the sub-pixel 11b to the display area side by the light shield layer 26a of the non-display area.

Accordingly, the signal line 16 formed on the sub-pixel 11a and 11b sides of both ends of the display area is shielded by the light shield layers 26a and 26b of the non-display area, the jaggedness does not occur in the display area, and it is possible to make the periphery of the display area smooth.

Second Embodiment

Figure 5:
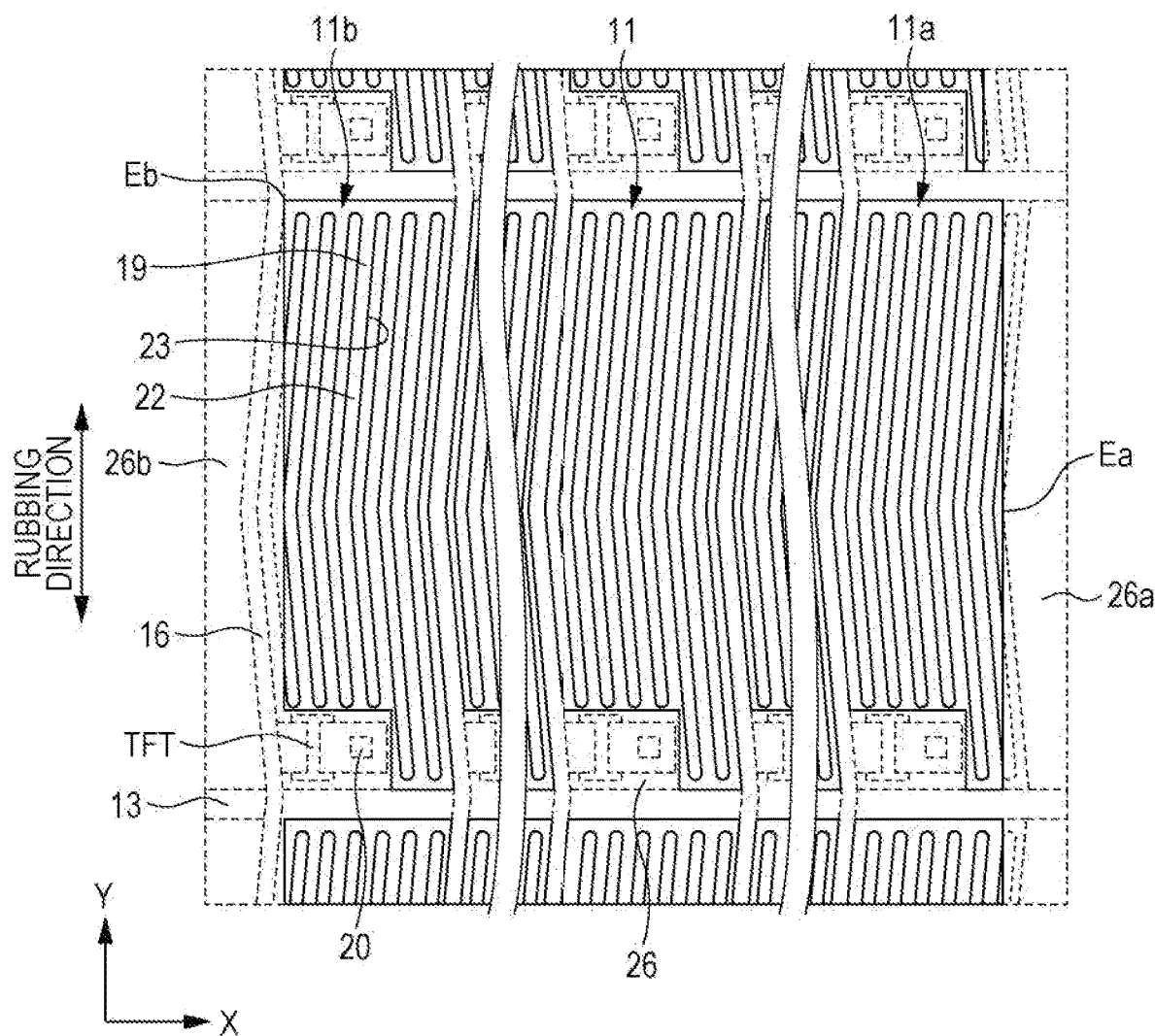
FIG. 5 is a plan view illustrating a liquid crystal display panel of a second embodiment.

Next, a liquid crystal display panel 10A according to a second embodiment will be described with reference to FIG. 5. In FIG. 5, the same reference numerals and signs are given to the same configuration as the liquid crystal display panel 10, and the detailed description is omitted. The liquid crystal display panel 10A of the second embodiment is different in size of the light shield layer 26 forming the apertures of the display area from that of the first embodiment.

In the liquid crystal display panel 10 of the first embodiment, as shown in FIG. 2, in the sub-pixel 11a (right end in FIG. 2) in which the outermost side of the sub-pixel 11 positioned on the outermost peripheral side of the display area is the inner angle side, the light shielding is performed over the curved point Ea of the inner angle side of the sub-pixel 11a to the display area side by the light shield layer 26a of the non-display area. In the sub-pixel 11b (left end in FIG. 2) in which the outermost side of the sub-pixel 11 positioned on the outermost peripheral side of the display area is the outer angle side, the light shielding is performed over the end point Eb of the outer angle side of the sub-pixel 11b to the display area side by the light shield layer 26b of the non-display area. With such a configuration, even when there is superposition misalignment between the array substrate AR and the color filter substrate CF, or production error, it is possible to make the periphery of the display area smooth.

However, in the liquid crystal display panel 10 of the first embodiment, the light shielding is performed on the display area by the light shield layers 26a and 26b of the non-display area. Accordingly, the area of the sub-pixel of the outermost peripheral side is reduced, and thus the sub-pixel becomes darker than the sub-pixels of the other parts. In the liquid crystal display panel 10A of the second embodiment, the jaggedness does not occur in the periphery of the display area and the sub-pixel of the outermost peripheral side becomes the brightest.

In the liquid crystal display panel 10A of the second embodiment, when the sub-pixel positioned on the outermost peripheral side of the display area is the sub-pixel 11a in which the outermost side is the inner angle side, the light shield layer 26a of the non-display area is formed to pass through the curved point Ea of the inner angle side of the sub-pixel 11a. In addition, when the sub-pixel positioned on the outermost peripheral side of the display area is the sub-pixel 11b in which the outermost side is the outer angle side, the light shield layer 26a of the non-display area is formed to pass through the end point Eb of the outer angle side of the sub-pixel.

According to the liquid crystal display panel 10A of the second embodiment with such a configuration, the signal lines 16 are shielded by the light shield films 26a and 26b. Accordingly, the jaggedness does not occur in the periphery of the display area. According to the liquid crystal display panel 10A of the second embodiment, when the display area side is further covered by the light shield layers 26a and 26b of the non-display area, the jaggedness does not occur in the periphery of the display area. However, the aperture area of the sub-pixel is reduced, and thus the sub-pixel becomes dark. On the contrary, when the light shield layers 26a and 26b of the non-display area are retreated to the non-display area, the aperture area of the sub-pixel is increased to be bright. However, the signal line 16 appears in the periphery of the display area, and thus the jaggedness occurs.

According to the liquid crystal display panel 10A of the second embodiment shown in FIG. 5, the jaggedness does not occur in the periphery of the display area, and it becomes the brightest state. In liquid crystal display panel of the second embodiment, the jaggedness does not occur in the periphery of the display area even in any of the sub-pixels 11a and 11b of the outermost peripheral side, and it becomes the brightest state, but both are not necessarily in such a state. That is, only one side of the sub-pixels 11a and 11b of the outermost peripheral side may employ the same configuration as the case of the liquid crystal display panel 10A of the second embodiment, and the other side may employ the same configuration as the case of the liquid crystal display panel 10 of the first embodiment.

Third Embodiment

Figure 6:
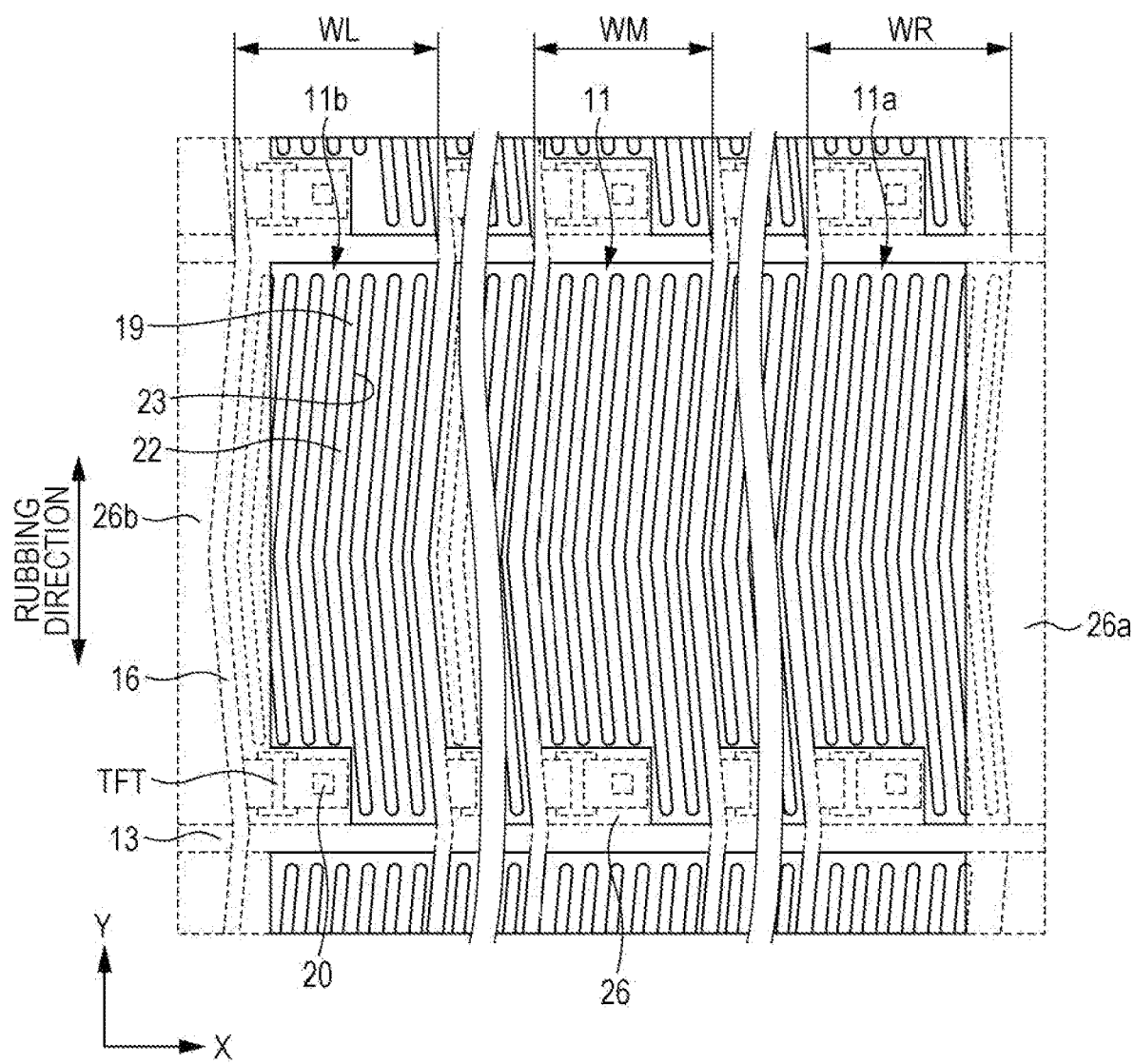
FIG. 6 is a plan view illustrating a liquid crystal display panel of a third embodiment.

Next, a liquid crystal display panel 10B according to a third embodiment will be described with reference to FIG. 6. In FIG. 6, the same reference numerals and signs are given to the same configuration as the liquid crystal display panel 10 of the first embodiment, and the detailed description is omitted. The liquid crystal display panel 10B of the third embodiment is different from that of the first embodiment in regard to the size of the sub-pixels 11a and 11b of the outermost peripheral side of the display area.

In the liquid crystal display panel 10 of the first embodiment, as shown in FIG. 2, the sub-pixels 11 have the same size, including the sub-pixels 11a and 11b of the outermost peripheral side of the display area. In this respect, in the liquid crystal display panel 10B of the third embodiment, as shown in FIG. 6, a width of the sub-pixels 11 other than both ends of the display area is WM, a width of the sub-pixel 11a of the right end is WR (WR>WM) larger than WM, and a width of the sub-pixel 11b of the left end is WL (WL>WM) larger than WM.

With such a configuration, even when most of the display area side is covered by the light shield layers 26a and 26b to solve the jaggedness of the sub-pixels 11a and 11b of the peripheral portion of the display area, the aperture areas of the sub-pixels 11a and 11b of the periphery of the display area can be made equal to the aperture area of the sub-pixels 11 of the other parts. For this reason, according to the liquid crystal display panel 10B of the third embodiment, the jaggedness does not occur in the sub-pixels 11a and 11b of the peripheral portion of the display area, and the aperture ratio of the sub-pixels 11a and 11b of the peripheral portion of the display area can be made equal to the aperture ratio of the sub-pixels 11 of the other parts. Accordingly, it is possible to suppress a coloring defect or a decrease of brightness in the peripheral portion.

Fourth Embodiment

Next, a liquid crystal display panel 10C according to a fourth embodiment will be described with reference to FIG. 7. In FIG. 7, the same reference numerals and signs are given to the same configuration as the liquid crystal display panel 10 of the first embodiment, and the detailed description is omitted. The liquid crystal display panel 10C of the fourth embodiment is different from that of the liquid crystal display panel 10 of the first embodiment in respect to the presence or absence of a dummy pixel of the non-display area.

As shown in FIG. 7, in the liquid crystal display panel 10C of the fourth embodiment, in the non-display area covered with the light shield layer 26, a dummy pixel 36 is provided adjacent to the outer peripheral side of the sub-pixel of the display area. The dummy pixel 36 has the same configuration as that of the sub-pixel 11, but is different from the sub-pixels 11, 11a, and 11b of the display area, and the electric field is not applied to the liquid crystal layer LC. For example, the dummy pixel 36 simulates the same configuration as that of the sub-pixel, forms a dummy pixel electrostatic protective circuit, and is used to form a protective unit against the infiltration of static electricity from the outside.

As described above, when the area where the electric field is applied and the area where the electric field is not applied are adjacent at the boundary portion between the display area and the non-display area, the alignment of the display area where the electric field is applied is disarranged, and thus a domain (alignment defect) occurs. However, in the liquid crystal display panel 10C of the fourth embodiment, the domain occurring on the further peripheral side of the sub-pixels 11a and 11b of the outermost peripheral side of the display area can be made into a state where it is not recognizable by the light shield layers 26*a* and 26*b* of the non-display area. Accordingly, there is no adverse influence on display image quality.

In the embodiment described above, the example of the FFS mode liquid crystal display panel in which the sub-pixel is provided with one curved portion curved in the "<" shape is described, but the present disclosure may be applied to an FFS mode liquid crystal display panel in which the sub-pixel is provided with a plurality of zigzag curved portions. In the embodiment described above, the example of the FFS mode liquid crystal display panel in which one curved portion curved in the "<" shape along the signal line is formed as the sub-pixel is described, but the present disclosure may be applied to an FFS mode liquid crystal display panel provided with one curved portion or a plurality of zigzag curved portions curved in the "<" shape along the signal line is formed as the sub-pixel. In the embodiment described above, the example of the FFS mode liquid crystal display panel is described, but the present disclosure may be applied to the IPS mode liquid crystal display panel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display panel comprising:
a first substrate and a second substrate opposed to each other with a liquid crystal layer therebetween;
scan lines extending overall in a first direction;
signal lines extending overall in a second direction crossing the first direction;
a plurality of pixels that are surrounded by the scan lines and the signal lines and that are arranged in a matrix, the plurality of pixels including
a first pixel having a first opening and arranged in an outermost area in a display area in the first direction, and
a second pixel having a second opening and arranged in an area other than the outermost area in the display area; and
a light shield layer surrounding the first pixel and the second pixel,
wherein
each of the pixels includes
a lower electrode,
an insulating film formed on the lower electrode, and
an upper electrode formed on the insulating film and provided with a slit-shaped aperture having a predetermined angle with respect to the second direction,
the slit-shaped aperture partially overlaps the light shield layer surrounding the respective pixels,
the light shield layer includes
a first light shield that surrounds the respective pixels, the first light shield including an outermost light shield that covers an outermost side of the first pixel in the first direction, and
a second light shield that covers thin film transistors of the respective pixels and that is other than the first light shield,
a length of the first opening between the outermost light shield and the second light shield in the first direction is different from a length of the second opening between the first light shield other than the outermost light shield and the second light shield in the first direction, and
the respective pixels are surrounded by the light shield layer overlapping the signal lines and the scan lines that are adjacent to the respective pixels.

2. The liquid crystal display panel according to claim 1, wherein
the first substrate has a first surface side and a second surface side that faces the liquid crystal layer, and
the scan lines and the signal lines are overlapped by the light shield layer, and are disposed on the second surface side of the first substrate.

3. The liquid crystal display panel according to claim 2, wherein
the second substrate has a first surface side that faces the liquid crystal layer, and
the light shield layer is disposed on the first surface side of the second substrate.

4. The liquid crystal display panel according to claim 3, wherein the signal lines are bent along a shape of the pixels or the slit-shaped aperture.

5. A liquid crystal display panel comprising:
a first substrate and a second substrate opposed to each other with a liquid crystal layer therebetween;
scan lines extending overall in a first direction;
signal lines extending overall in a second direction crossing the first direction; and
a plurality of pixels arranged in the first direction and the second direction, in a display area, each of the pixels having a lower electrode and an upper electrode that has a slit-shaped aperture having a predetermined angle with respect to the second direction,
wherein
the plurality of pixels, respectively surrounded by a light shield layer, include
a first pixel having a first opening and located in an outermost peripheral side of the display area and
a second pixel having a second opening and located in other than the outermost peripheral side,
the slit-shaped aperture of the first pixel is overlapped with the light shield layer surrounding the respective pixels,
the light shield layer includes
a first light shield that surrounds the respective pixels, the first light shield including an outermost light shield that covers an outermost side of the first pixel in the first direction, and
a second light shield that covers thin film transistors of the respective pixels and that is other than the first light shield,
a length of the first opening between the outermost light shield and the second light shield in the first direction is different from a length of the second opening between the first light shield other than the outermost light shield and the second light shield in the first direction, and
the respective pixels are surrounded by the light shield layer overlapping the signal lines and the scan lines that are adjacent to the respective pixels.

6. The liquid crystal display panel according to claim 5, wherein
the first substrate has a first surface side and a second surface side that faces the liquid crystal layer, and
the scan lines and the signal lines are overlapped by the light shield layer, and are disposed on the second surface side of the first substrate.

7. The liquid crystal display panel according to claim 6, wherein the signal lines are bent along a shape of the pixels or the slit-shaped aperture.

* * * * *